(12) United States Patent
Shrouder

(10) Patent No.: US 10,624,400 B1
(45) Date of Patent: Apr. 21, 2020

(54) SAFETY HELMET

(71) Applicant: Alvin Shrouder, Brooklyn, NY (US)

(72) Inventor: Alvin Shrouder, Brooklyn, NY (US)

( * ) Notice: Subject to any disclaimer, the term of this patent is extended or adjusted under 35 U.S.C. 154(b) by 0 days.

(21) Appl. No.: 15/433,899

(22) Filed: Feb. 15, 2017

Related U.S. Application Data

(60) Provisional application No. 62/295,762, filed on Feb. 16, 2016.

(51) Int. Cl.
| | |
|---|---|
| *B60Q 5/00* | (2006.01) |
| *A41D 31/00* | (2019.01) |
| *A42B 3/04* | (2006.01) |
| *A42B 3/30* | (2006.01) |
| *G10K 11/18* | (2006.01) |
| *H05B 33/08* | (2020.01) |
| *H02S 20/30* | (2014.01) |

(52) U.S. Cl.
CPC .............. *A41D 31/00* (2013.01); *A42B 3/042* (2013.01); *A42B 3/044* (2013.01); *A42B 3/30* (2013.01); *B60Q 5/005* (2013.01); *B60Q 5/006* (2013.01); *G10K 11/18* (2013.01); *H02S 20/30* (2014.12); *H05B 33/0803* (2013.01)

(58) Field of Classification Search
CPC ......... G08B 25/00; B60Q 5/005; B60Q 5/006
See application file for complete search history.

(56) References Cited

U.S. PATENT DOCUMENTS

| | | | | |
|---|---|---|---|---|
| 4,559,586 A * | 12/1985 | Slarve | ................. | B60Q 1/2676 340/432 |
| 5,207,500 A * | 5/1993 | Rios | ..................... | A42B 3/0446 340/475 |
| 5,353,008 A * | 10/1994 | Eikenberry | .......... | A42B 3/0453 2/422 |
| 6,406,168 B1 * | 6/2002 | Whiting | ............... | A42B 3/0453 362/105 |
| 6,982,633 B2 * | 1/2006 | Burdick | ............... | A42B 3/0453 340/332 |
| 7,667,586 B2 * | 2/2010 | Cheng | ................. | B60Q 1/2676 180/167 |
| 7,857,479 B1 * | 12/2010 | Marroquin | ........... | A42B 3/0453 340/479 |
| 2006/0012471 A1 * | 1/2006 | Ross, Jr. | ............... | A42B 3/0453 340/479 |
| 2007/0285221 A1 * | 12/2007 | Howe | ................... | B60Q 1/2676 340/479 |
| 2009/0158508 A1 * | 6/2009 | Quaranta | ............. | A42B 3/0453 2/421 |
| 2016/0355126 A1 * | 12/2016 | Anderson | .......... | H04N 5/23203 |
| 2016/0360817 A1 * | 12/2016 | Lombard | ............ | F21V 33/0008 |
| 2018/0174431 A1 * | 6/2018 | Cholhan | .............. | G08B 25/016 |

* cited by examiner

Primary Examiner — Tajash D Patel
(74) Attorney, Agent, or Firm — Bruce A. Lev

(57) ABSTRACT

An improved safety helmet is a safety helmet for an emergency responder such as a policeman or a fireman that has a plurality of light emitting diodes that are able to flash in various combinations of sequences and in standard emergency light colors to make the emergency responder more visible to others in the vicinity. The safety helmet has a battery power source, a video camera, a transmitter, a receiver, a solar panel for charging the battery, and a thermal imaging scope formed into the safety helmet. There may also be a USB port and cable for recording and downloading.

16 Claims, 4 Drawing Sheets

SAFETY HELMET

CROSS-REFERENCE TO RELATED APPLICATION

The present application is related to and claims priority from prior provisional application Ser. No. 62/295,762, filed Feb. 16, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of protective helmets and more specifically relates to an improved safety helmet.

2. Description of the Related Art

In this age of fast travel, velocities are greater than at any time in past history. Vehicles are very much different as well. Generally when riding in four wheeled vehicles, an individual has a degree of safety because of the enclosed cabin around the occupants. Motorcycles have proliferated as well and are not only used by civilians, but also have considerable use in law enforcement. Two wheeled vehicles, however, such as motorcycles and some bicycles, are able to travel at speeds that require additional safety for the rider. With the higher velocities and inevitable resulting accidents, head trauma is very common. One answer to the problem of the need for additional safety is in the form of protective headgear.

Helmets have been specially designed to address much of the issue. The helmets used by modern cyclists are specially built having an inner and an outer shell and a layer of shock absorbent material in between the inner and outer shells. These helmets are very effective in limiting injury during an accident however, they also have a downside. Some accidents are caused by the inability of the rider not being able to hear other vehicles around them. The shock absorbent layer also acts as a sound barrier sometimes causing accidents that wouldn't have otherwise happened. Fire fighters have safety helmets as well that do not have the visibility issue and are lacking the shock absorbent layer but instead have a liner and band that holds the helmet with a space between the shell and the wearers head A second safety issue is that other vehicles tend to not see cyclists and either run into them or pull out in front of them causing the cyclist to impact the broad side of the four wheeled vehicle or other solid objects while attempting to avoid the collision. The decreased visibility is also on the part of the cyclist because of the large size of the helmets almost eliminating peripheral vision. Fire fighter's have an issue with low visibility also except the decreased visibility is due to smoke and fire. Many design attempts to improve visibility have been made but the issue still substantially remains. There is a need for a helmet that is able to address these problems.

Various attempts have been made to solve the above-mentioned problems such as those found in U.S. Pat. No. 4,559,586 to Michael Slarve; U.S. Pat. No. 7,857,479 to Carlos R. Marroquin; and U.S. Pat. No. 6,406,168 to William Scott Whiting. This art is representative of protective helmets. None of the above inventions and patents, taken either singly or in combination, is seen to describe the invention as claimed.

Ideally, a protective helmet should provide increased visibility and a method of communication with other drivers and emergency workers, and yet, would operate reliably and be manufactured at a modest expense. Thus, a need exists for a reliable improved safety helmet to avoid the above-mentioned problems.

BRIEF SUMMARY OF THE INVENTION

In view of the foregoing disadvantages inherent in the known protective helmet art, the present invention provides a novel improved safety helmet. The general purpose of the present invention, which will be described subsequently in greater detail, is to provide improved visibility and methods of communication with other drivers or emergency workers.

The improved safety helmet preferably comprises an exterior shell portion adapted to fit around and protect the head of an emergency responder or a helmet wearer, a power source connected to the exterior shell portion, a plurality of light members connected to the exterior surface of the exterior shell portion and electrically connected to the power source, a control member connected to the exterior shell portion that is electrically connected to the power source and the plurality of light members and is adapted to light individual light members at different time intervals, and a receiver member connected to the exterior shell portion and electrically connected to the power source and the control member. The receiver member is adapted to receive signals from the emergency transmitter for activating the plurality of light members which may be BLUETOOTH technology.

The transmitter member is connected to the exterior shell portion and is electrically connected to the power source and is adapted to send signals to the emergency receiver. A video camera is connected to the exterior shell portion and is electrically connected to the power source and the transmitter member and is adapted to send video images to the emergency receiver. A thermal imaging scope may also be connected to the exterior shell portion that is electrically connected to the power source and is adapted to aid an emergency responder in locating victims in thick smoke. The light members emit colors of light chosen from the list of colors consisting of, red, white, blue, yellow, and amber, and each light member are outlined with bright white LED light boarders to differentiate the lighting that is displayed from all other types of vehicle lights. The bright white LED light borders around each light differentiate the motorcycle lights from all other cars, trucks, brakes lights, and emergency vehicle lights at first glance. The headlight is able to be switched from low beam to high beam via the motorcycle headlight switch.

A control member is adapted to produce flashing of the light members in a chosen sequence. The light members are preferably light emitting diodes. A solar panel is connected to the exterior top surface of the exterior shell portion and is electrically connected to the power source and thereby adapted to provide electrical energy (charging) to the power source. The power source may be formed as rechargeable batteries and includes a power cord adapted to be plugged into an external power source. A USB cable and a USB port are both connect to the exterior shell portion and electrically connected to the power source and the control member.

The improved emergency responder system may comprise a main control unit that includes an emergency transmitter that is adapted to send electronic signals to a plurality of safety helmets. The emergency receiver is adapted to receive electronic signals from other improved safety helmets. The main control unit is adapted to be placed within an emergency vehicle and used to communicate with and control the plurality of safety helmets that each comprise an exterior shell portion that is adapted to fit around and protect the head of an emergency responder. A power source is connected to the exterior shell portion and to the plurality of light members.

A control member is connected to the exterior shell portion, electrically connected to the power source, and the light members. The control member is adapted to light individual light members at different programmed time intervals. The receiver member is connected to the exterior shell portion and electrically connected to the power source and the control member. The receiver member is adapted to receive signals from the emergency transmitter of the main control unit for activating the light members. The receiver member includes BLUETOOTH technology for receiving signals from the emergency transmitter. The transmitter member is connected to the exterior shell portion and is electrically connected to the power source and is adapted to send signals to the emergency receiver and a video camera. The video camera is connected to the exterior shell portion and is electrically connected to the power source and the transmitter member and wherein the video camera is adapted to send video images to the emergency receiver.

There may also be a scope with display screen connected to the exterior shell portion that is also electrically connected to the power source. The thermal imaging scope is adapted to aid an emergency responder in locating victims in thick smoke and the plurality of light members emit colors of light chosen from a list of colors consisting of, red, white, blue, yellow, and amber that are able to be flashed in certain chosen sequences via the control member. The light members are preferably light emitting diodes.

There may be a solar panel connected to the exterior top surface of the exterior shell portion that is electrically connected to the power source, or battery, and thereby adapted to recharge the power source. A USB cable and a USB port may be both connected to the exterior shell portion and electrically connected to the power source and the control member.

The present invention holds significant improvements and serves as an improved safety helmet. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved safety helmet, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a protective helmet and more particularly to an improved safety helmet as used to improve the visibility and method of communication with other drivers or emergency workers.

Generally speaking, an improved safety helmet is a safety helmet for an emergency responder such as a policeman or a fireman that has a plurality of light emitting diodes that are able to flash in various combinations of sequences and in standard emergency light colors to make the emergency responder more visible to others in the vicinity. The safety helmet has a battery power source, a video camera, a transmitter, a receiver, a solar panel for charging the battery, and a thermal imaging scope formed into the safety helmet. There may also be a USB port and cable for recording and downloading.

Figure 1:
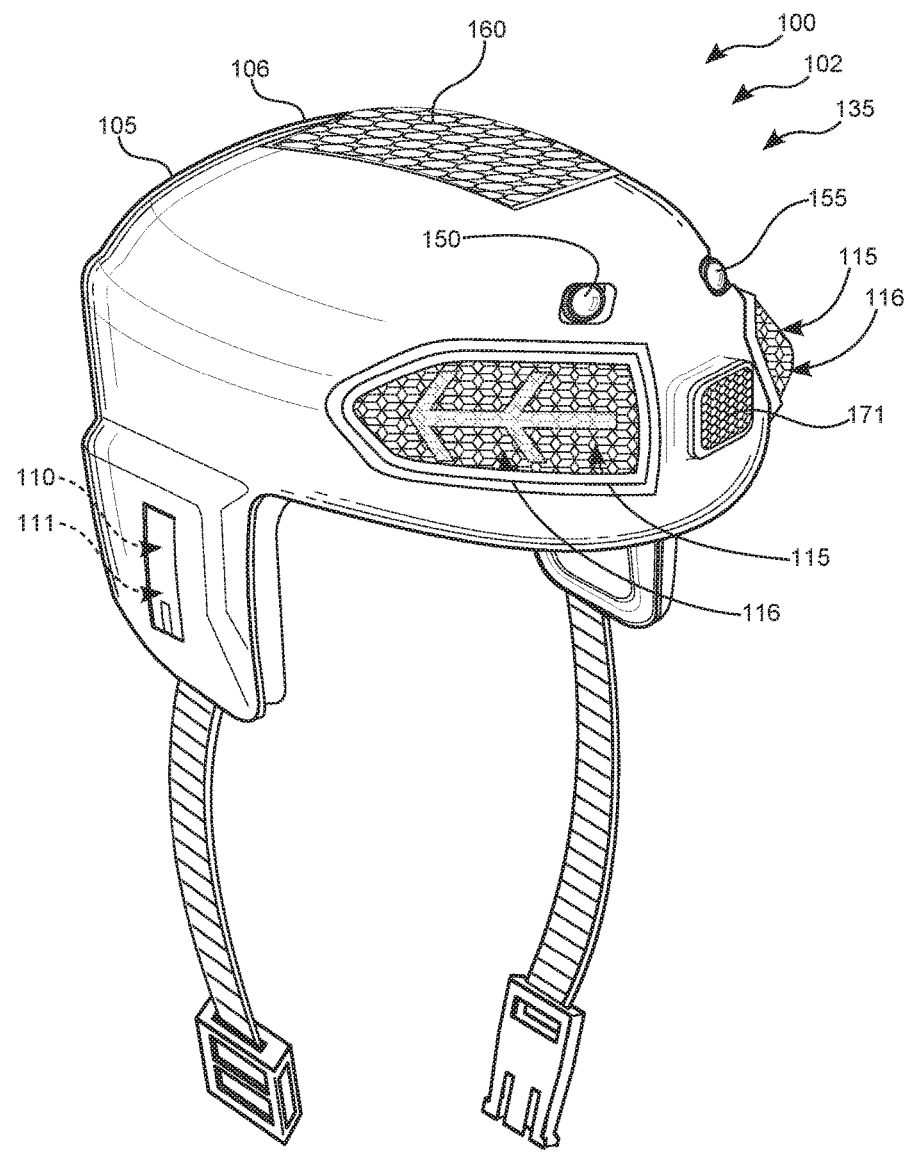
FIG. 1 shows a front perspective view illustrating an improved safety helmet according to an embodiment of the present invention.

In greater detail now, referring to the drawings by numerals of reference there is shown in FIG. 1, a front perspective view illustrating improved safety helmet 100 according to an embodiment of the present invention.

Improved safety helmet 100 preferably comprises exterior shell portion 105 adapted to fit around and protect the head of an emergency responder or a helmet wearer, power source 110 connected to exterior shell portion 105, a plurality of light members 115 including headlight 171 connected to the exterior surface of exterior shell portion 105 and electrically connected to power source 110, control member 120 connected to exterior shell portion 105 that is electrically connected to power source 110 and the plurality of light members 115 and is adapted to light individual light members 115 at different time intervals, and receiver member 125 connected to exterior shell portion 105 and electrically connected to power source 110 and control member 120. Receiver member 125 is adapted to receive signals from emergency transmitter 130 for activating the plurality of light members 115 which may be controlled by BLUETOOTH technology 135. Transmitter member 140 is connected to exterior shell portion 105 and is electrically connected to power source 110 and is adapted to send signals to emergency receiver 145. Video camera 150 is connected to exterior shell portion 105 and is electrically connected to power source 110 and transmitter member 140 and is adapted to send video images to emergency receiver 145. Each light member 115 is outlined with bright white LED 116 light boarders to differentiate the lighting that is displayed from all other types of vehicle lights. The bright white LED 116 light borders around each light 115 differentiate the motorcycle lights from all other cars, trucks, brakes lights, and emergency vehicle lights at first glance.

Figure 2:
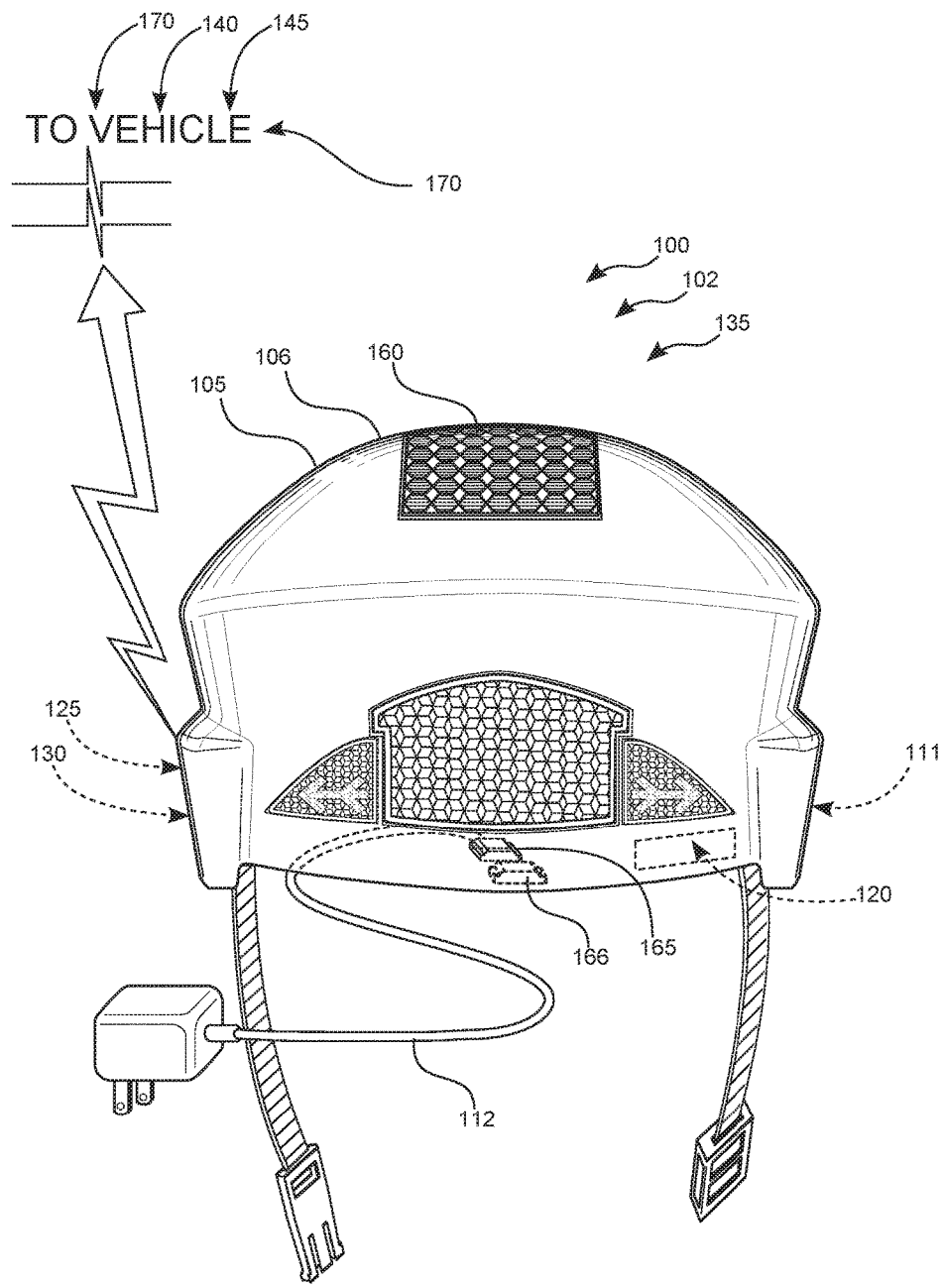
FIG. 2 is a side elevation view illustrating the improved safety helmet according to an embodiment of the present invention of FIG. 1.

Referring now to FIG. 2, a side elevation view illustrating improved safety helmet 100 according to an embodiment of the present invention of FIG. 1.

Thermal imaging scope 155 may also be connected to exterior shell portion 105 that is electrically connected to power source 110 and is adapted to aid an emergency responder in locating victims in thick smoke. Light members 115 emit colors of light chosen from the list of colors consisting of, red, white, blue, yellow, and amber, and each light member 115 may be outlined with bright white LED light 116 boarders to differentiate the lighting that is displayed from all other types of vehicle lights. The headlight 171 is able to be switched from low beam to high beam via the motorcycle headlight switch. Control member 120 is adapted to produce flashing of light members 115 in a chosen sequence. Light members 115 are preferably light emitting diodes 116. Solar panel 160 is connected to exterior top surface 106 of exterior shell portion 105 and is electrically connected to power source 110 and thereby adapted to provide electrical energy (charging) to power source 110. Power source 110 may be formed as rechargeable batteries 111 and includes power cord 112 adapted to be plugged into an external power source. USB cable 165 and USB port 166 are both connect to exterior shell portion 105 and electrically connected to power source 110 and control member 120. Each light member 115 is outlined with bright white LED 116 light boarders to differentiate the lighting that is displayed from all other types of vehicle lights. The bright white LED 116 light borders around each light 115 differentiate the motorcycle lights from all other cars, trucks, brakes lights, and emergency vehicle lights at first glance.

Figure 3:
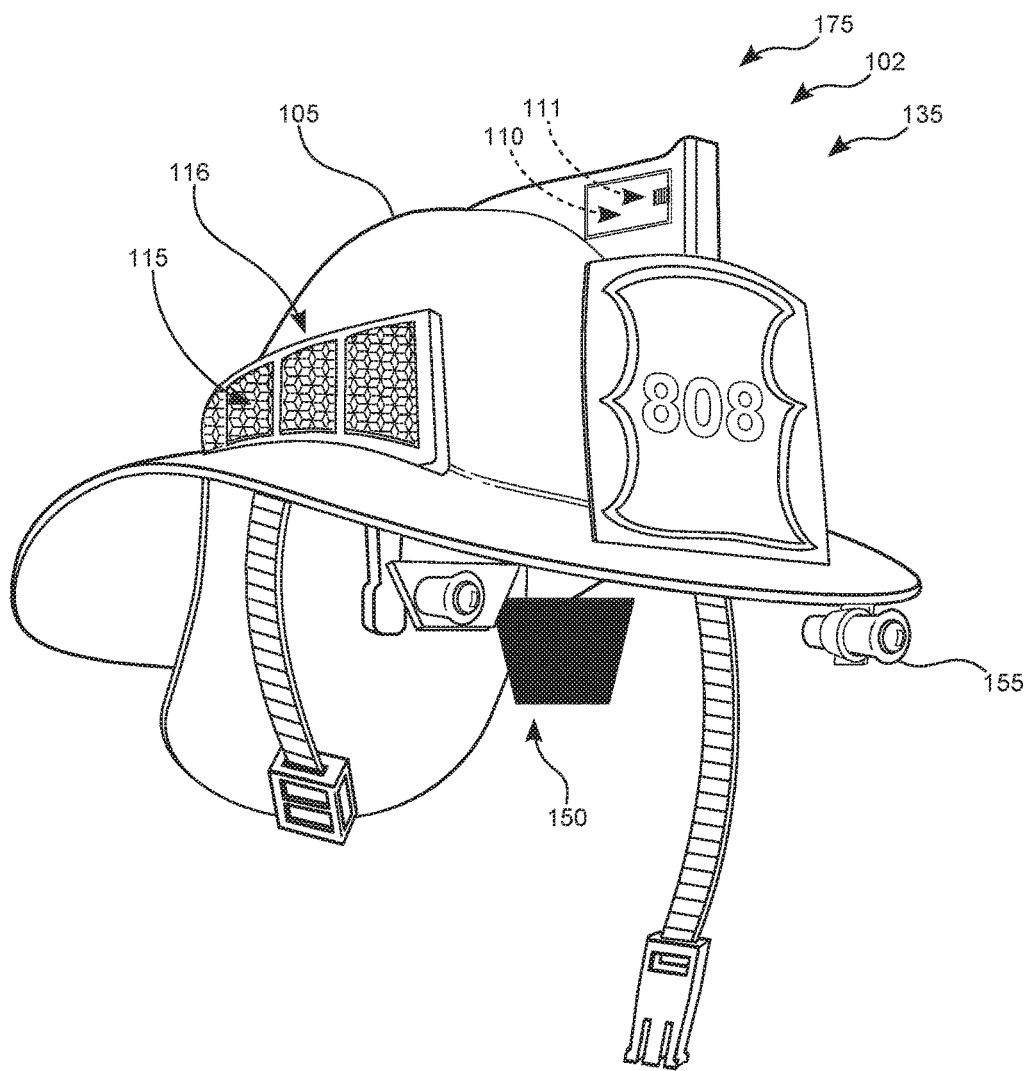
FIG. 3 is a front perspective view illustrating the improved safety helmet for fire fighters according to an embodiment of the present invention of FIG. 1.

Referring now to FIG. 3, is a front perspective view illustrating improved safety helmet 100 for fire fighters according to an embodiment of the present invention of FIG. 1.

Improved emergency responder system 175 may comprise main control unit 170 that includes emergency transmitter 130 that is adapted to send electronic signals to a plurality of safety helmets 102. Emergency receiver 145 is adapted to receive electronic signals from other improved safety helmets 100. Main control unit 170 is adapted to be placed within an emergency vehicle and used to communicate with and control the plurality of safety helmets 102 that each comprise exterior shell portion 105 that is adapted to fit around and protect the head of an emergency responder. Power source 110 is connected to exterior shell portion 105 and to the plurality of light members 115. Control member 120 is connected to exterior shell portion 105, electrically connected to power source 110, and light members 115. Control member 120 is adapted to light individual light members 115 at different programmed time intervals. The receiver member is connected to exterior shell portion 105 and electrically connected to power source 110 and control member 120. Receiver member 125 is adapted to receive signals from the emergency transmitter of main control unit 170 for activating light members 115.

Figure 4:
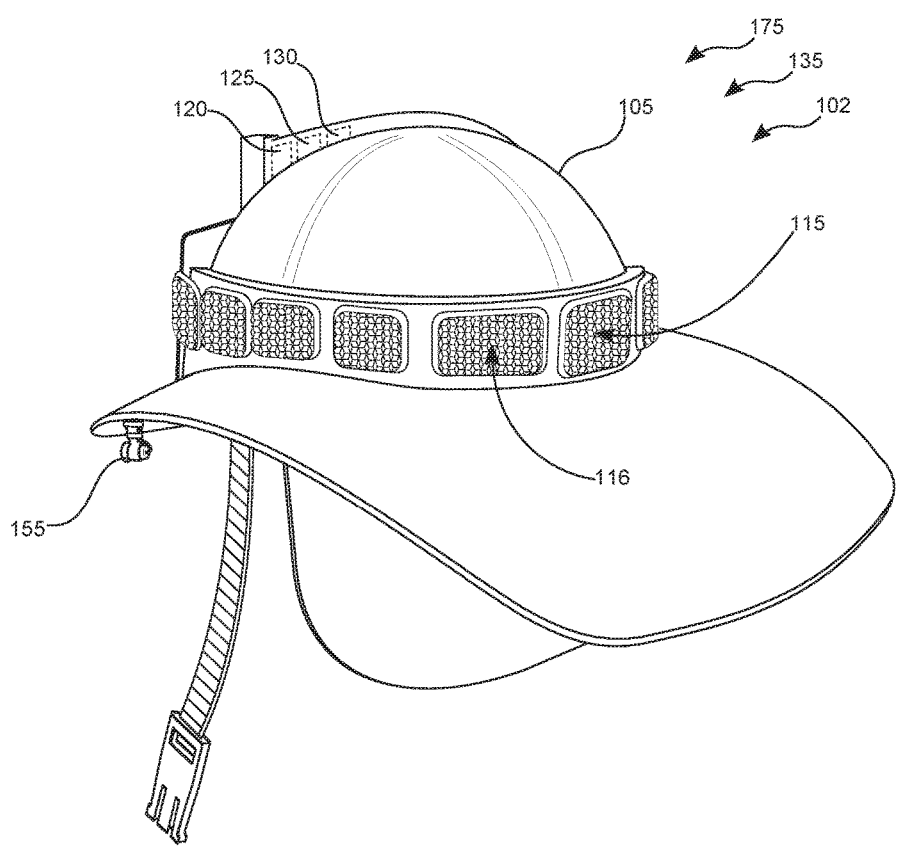
FIG. 4 is a side elevation view illustrating the improved safety helmet for fire fighters according to an embodiment of the present invention of FIG. 1.

Referring now to FIG. 4, is a side elevation view illustrating improved emergency responder system 175 according to an embodiment of the present invention of FIG. 1.

Receiver member 125 includes BLUETOOTH technology 135 for receiving signals from emergency transmitter 130. Transmitter member 140 is connected to exterior shell portion 105 and is electrically connected to power source 110 and is adapted to send signals to emergency receiver 145 and video camera 150. Video camera 150 is connected to exterior shell portion 105 and is electrically connected to power source 110 and transmitter member 140 and wherein video camera 150 is adapted to send video images to emergency receiver 145. There may also be thermal imaging scope 155 connected to exterior shell portion 105 that is also electrically connected to power source 110. Thermal imaging scope 155 is adapted to aid an emergency responder in locating victims in thick smoke and the plurality of light members 115 emit colors of light chosen from a list of colors consisting of, red, white, blue, yellow, and amber that are able to be flashed in certain chosen sequences via control member 120. Light members 115 are preferably light emitting diodes 116. Each light member 115 is outlined with bright white LED 116 light boarders to differentiate the lighting that is displayed from all other types of vehicle lights. The bright white LED 116 light borders around each light 115 differentiate the motorcycle lights from all other cars, trucks, brakes lights, and emergency vehicle lights at first glance. There may be solar panel 160 connected to exterior top surface 106 of exterior shell portion 105 that is electrically connected to power source 110, or rechargeable batteries 111, and thereby adapted to recharge power source 110. USB cable 165 and USB port 166 may be both connected to exterior shell portion 105 and electrically connected to power source 110 and control member 120.

Improved safety helmet 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An improved safety helmet comprising:
   an exterior shell portion;
      wherein said exterior shell portion is adapted to fit around and protect the head of an emergency responder;
   a power source;
      wherein said power source is connected to said exterior shell portion;
   a plurality of light members;
      wherein said plurality of light members are connected to an exterior surface of said exterior shell portion and electrically connected to said power source;
   a control member;
      wherein said control member is connected to said exterior shell portion and is electrically connected to said power source and said plurality of light members; and
      wherein said control member is adapted to light individual ones of said plurality of light members and at different time intervals;
   a receiver member;
      wherein said receiver member is connected to said exterior shell portion and electrically connected to said power source and said control member; and
      wherein said receiver member is adapted to receive signals from an emergency transmitter for activating said plurality of light members;
   a transmitter member;
      wherein said transmitter member is connected to said exterior shell portion and is electrically connected to said power source and is adapted to send signals to an emergency receiver; and
   a video camera;
      wherein said video camera is connected to said exterior shell portion and is electrically connected to said power source and said transmitter member; and
      wherein said video camera is adapted to send video images to said emergency receiver.

2. The improved safety helmet of claim 1, wherein said receiver member includes BLUETOOTH technology for receiving said signals from said emergency transmitter.

3. The improved safety helmet of claim 1, further comprising:
   a thermal imaging scope;
      wherein said thermal imaging scope is connected to said exterior shell portion and is electrically connected to said power source; and
      wherein said thermal imaging scope is adapted to aid an emergency responder in locating victims in thick smoke.

4. The improved safety helmet of claim 1, wherein said plurality of light members emit colors of light chosen from a list of colors consisting of, red, white, blue, yellow, and amber.

5. The improved safety helmet of claim 4, wherein said control member is adapted to produce flashing of said plurality of light members in a chosen sequence.

6. The improved safety helmet of claim 1, wherein said plurality of light members are light emitting diodes.

7. The improved safety helmet of claim 1, further comprising:
   a solar panel;
      wherein said solar panel is connected to an exterior top surface of said exterior shell portion and is electrically connected to said power source and thereby adapted to provide electrical energy to said power source.

8. The improved safety helmet of claim 1, wherein said power source is formed as rechargeable batteries.

9. The improved safety helmet of claim 1, wherein said power source includes a power cord adapted to be plugged into an external power source.

10. An improved safety helmet comprising:
    an exterior shell portion;
       wherein said exterior shell portion is adapted to fit around and protect the head of an emergency responder;
    a power source;
       wherein said power source is connected to said exterior shell portion;
    a plurality of light members;
       wherein said plurality of light members are connected to an exterior surface of said exterior shell portion and electrically connected to said power source;
    a control member;
       wherein said control member is connected to said exterior shell portion and is electrically connected to said power source and said plurality of light members; and
       wherein said control member is adapted to light individual ones of said plurality of light members and at different time intervals;
    a receiver member;
       wherein said receiver member is connected to said exterior shell portion and electrically connected to said power source and said control member; and
       wherein said receiver member is adapted to receive signals from an emergency transmitter for activating said plurality of light members; and
    a USB cable and a USB port both connected to said exterior shell portion and electrically connected to said power source and said control member.

11. An improved emergency responder system comprising:
    a main control unit including:
       an emergency transmitter;
          wherein said emergency transmitter is adapted to send electronic signals to a plurality of safety helmets; and
       an emergency receiver;
          wherein said emergency receiver is adapted to receive electronic signals from said plurality of safety helmets;
       wherein said main control unit is adapted to be placed within an emergency vehicle and used to communicate with and control said plurality of safety helmets;
    a plurality of safety helmets, each comprising:
       an exterior shell portion;
          wherein said exterior shell portion is adapted to fit around and protect the head of an emergency responder;
       a power source;
          wherein said power source is connected to said exterior shell portion;
       a plurality of light members;
          wherein said plurality of light members are connected to an exterior surface of said exterior shell portion and electrically connected to said power source;

a control member;
   wherein said control member is connected to said exterior shell portion and is electrically connected to said power source and said plurality of light members; and
   wherein said control member is adapted to light individual ones of said plurality of light members and at different time intervals;
a receiver member;
   wherein said receiver member is connected to said exterior shell portion and electrically connected to said power source and said control member; and
   wherein said receiver member is adapted to receive signals from said emergency transmitter of said main control unit for activating said plurality of light members;
a transmitter member;
   wherein said transmitter member is connected to said exterior shell portion and is electrically connected to said power source and is adapted to send signals to said emergency receiver; and
a video camera;
   wherein said video camera is connected to said exterior shell portion and is electrically connected to said power source and said transmitter member; and
   wherein said video camera is adapted to send video images to said emergency receiver.

12. The improved safety helmet of claim 11, wherein said receiver member includes BLUETOOTH technology for receiving said signals from said emergency transmitter.

13. The improved safety helmet of claim 11, further comprising:
   a thermal imaging scope;
      wherein said thermal imaging scope is connected to said exterior shell portion and is electrically connected to said power source; and
      wherein said thermal imaging scope is adapted to aid an emergency responder in locating victims in thick smoke.

14. The improved safety helmet of claim 11, wherein said plurality of light members emit colors of light chosen from a list of colors consisting of, red, white, blue, yellow, and amber.

15. The improved safety helmet of claim 14, wherein said control member is adapted to produce flashing of said plurality of light members in a chosen sequence.

16. The improved safety helmet of claim 11, further comprising a USB cable and a USB port both connected to said exterior shell portion and electrically connected to said power source and said control member.

* * * * *